Patented Nov. 19, 1929

1,736,457

UNITED STATES PATENT OFFICE

WILLIAM J. MERTEN, OF PITTSBURGH, AND CHARLES T. GAYLEY, OF SWISSVALE, PENNSYLVANIA, ASSIGNORS TO WESTINGHOUSE ELECTRIC AND MANUFACTURING COMPANY, A CORPORATION OF PENNSYLVANIA

COMPOSITION OF MATTER FOR AND METHOD OF PURIFYING FUSED SALT BATHS

No Drawing. Application filed October 10, 1925. Serial No. 61,773.

Our invention relates to compositions of matter and more especially to materials and methods of purifying mixtures of salts to be used in fused condition for heat-treating and tempering metal.

It is among the objects of our invention to provide a material for quickly and efficiently eliminating sulphides, oxides and other impurities from a fused salt bath used for the heat treatment of steel, thereby removing materials having a destructive action on the steel.

Fused salt baths of various mixtures of salts are used for tempering and heat-treating steel. The mixtures are usually a combination of chlorides of the alkali metals and, in some instances, with an addition of an alkali earth metal chloride. Such compositions often contain small amounts of sulphides or sulphates and, in use, are contaminated with sulphides, sulphates, phosphates, carbonates, oxides and other foreign solid and slag-forming materials such as claylike particles which cause oxidation, decarbonization and pitting of the steel at high temperatures and also cause unequal heating of the steel in the bath.

Our invention provides a material and a method of cleansing a heated fused salt bath of a mixture of inorganic salts by purifying, removing and neutralizing such impurities and materials from the bath as decarbonize and attack the steel and cause pitting and imperfections therein.

In practice, we provide a mixture of boric acid and one or more of the inorganic salt constituents of the bath with or without an addition of charcoal or simply a mixture of boric acid and charcoal. This composition is added to the molten bath and, in the first instance, the boric acid or carbon or both react with the oxides, carbonates, phosphates, sulphates, sulphides and the inert and slag-forming material in the bath, and clean the bath by removing a part of the impurities as gases and by forming a dross or scum which collects on the surface of the bath. In case one or more of the constituents of the bath is admixed with the charcoal and boric acid, the mixture serves also to replenish the bath or to correct the composition of the bath, as the case may be, and, therefore, to maintain a salt bath of the desired proportions and melting point.

We prefer to add powdered carbonaceous material, such as charcoal, to the boric acid, without an addition of inorganic salt, in the proportions of 10 to 25% charcoal and the remainder boric acid. In making a mixture with one or more of the constituents of the fused bath, we may vary the salt-bath constituent within the limits of 5 to 95% of the mixture, and, in such case we prefer a composition of 75% to 95% of the salt bath constituent and the remainder charcoal and boric acid.

The carbonaceous material accelerates the reaction between the boric acid and the impurities of the bath. The carbon-boric acid purifying agent permits its use in baths of high or of comparatively low melting point. The carbon-boric acid or carbon-inorganic salt-boric acid mixture has an advantage over an inorganic salt-boric acid mixture. The carbon prevents the occurrence of a reversible reaction between the boric-acid slag constituents and the salt bath, and it thereby prevents the sulphur from recombining with the bath. The carbon reacts with the sulphur and with the oxides and forms gaseous carbon compounds such as carbon bisulphide and oxides of carbon, thereby removing the impurities, at least in part, as gaseous bodies. The boric acid acts in part to collect and remove all suspended particles in the bath and to segregate the same in the dross or slag which floats on the top of the bath.

The constituents may be mixed mechanically and added to the fused salt bath when the bath is melted, or the constituents may be fused together and then added to the bath.

Our invention provides a composition of matter and a method of removing harmful materials from a heat-treating bath of fused inorganic salts and of preventing decarbonization, pitting and unequal heating of the material treated therein.

Although we have described a specific embodiment of our invention, we do not wish to be limited thereto, since modifications of our invention will suggest themselves to those skilled in the art without departing from the spirit of our invention, the scope of which is defined in the annexed claims.

We claim as our invention:

1. A composition of matter which comprises charcoal, boric acid and an inorganic salt, the charcoal and boric acid being in the proportion of 10 to 25 parts charcoal and 90 to 75 parts boric acid.

2. A composition of matter comprising charcoal and boric acid, the charcoal and boric acid being present in the proportion of 10 to 25% charcoal and the remainder boric acid.

3. A composition of matter comprising charcoal, boric acid, and an inorganic salt, the inorganic salt being 5 to 95% of the mixture and the remainder being charcoal and boric acid in the proportions of 10 to 25 parts charcoal and 90 to 75 parts boric acid.

4. A composition of matter consisting of boric acid, an inorganic salt and charcoal, the inorganic salt being 5 to 95% of the mixture and the charcoal and boric acid being in the proportion of 10 to 25 parts charcoal and 90 to 75 parts boric acid.

5. The method of removing impurities from a heat-treating bath of fusible inorganic salts which comprises heating said bath to fusion and then adding a reactive mixture comprising boric acid and carbonaceous material.

6. The method of removing impurities from a heat-treating bath of fusible inorganic salts which comprises heating said bath to fusion and then adding a reactive mixture comprising boric acid and charcoal.

7. The method of removing impurities from a heat-treating bath of fusible inorganic salts which comprises fusing said salts and then adding to the fused bath a reactive mixture of a reducing slag-forming material comprising boric acid.

8. A composition of matter comprising charcoal and an acid compound of boron, the charcoal and boron compound being present in the proportion of 10 to 25% charcoal and 90 to 75% of the boron compound.

9. The method of removing impurities from a heat-treating bath of fusible inorganic salts which comprises fusing said salts and then adding to the fused bath a reactive mixture comprising an acid compound of boron.

In testimony whereof, we have hereunto subscribed our names this 2nd day of October, 1925.

WILLIAM J. MERTEN.
CHARLES T. GAYLEY.